(12) United States Patent
Fürhoff et al.

(10) Patent No.: US 8,170,757 B2
(45) Date of Patent: May 1, 2012

(54) SELECTION DEVICE FOR SHIFTING A VEHICLE TRANSMISSION

(75) Inventors: Achim Fürhoff, Kirchlengern (DE);
Knut Schwarz, Preussisch Oldendorf (DE); Gregori Dombrowski, Lübeck (DE); Torsten Stradal, Damme (DE)

(73) Assignee: Lemförder Electronic GmbH, Espelkamp (DE)

( * ) Notice: Subject to any disclaimer, the term of this patent is extended or adjusted under 35 U.S.C. 154(b) by 877 days.

(21) Appl. No.: 12/158,770

(22) PCT Filed: Dec. 15, 2006

(86) PCT No.: PCT/DE2006/002259
§ 371 (c)(1),
(2), (4) Date: Jun. 23, 2008

(87) PCT Pub. No.: WO2007/076814
PCT Pub. Date: Jul. 12, 2007

(65) Prior Publication Data
US 2009/0000413 A1    Jan. 1, 2009

(30) Foreign Application Priority Data

Dec. 20, 2005 (DE) .................. 10 2005 061 285

(51) Int. Cl.
*B60K 20/00* (2006.01)
(52) U.S. Cl. ......... 701/51; 74/473.3; 74/473.12; 70/248
(58) Field of Classification Search ............ 74/473.3
See application file for complete search history.

(56) References Cited

U.S. PATENT DOCUMENTS

| | | | |
|---|---|---|---|
| 2,683,995 A * | 7/1954 | Leiker | 477/105 |
| 2,736,003 A * | 2/1956 | Hastings | 340/456 |
| 2,916,944 A * | 12/1959 | Diesfeld | 477/121 |
| 3,602,061 A * | 8/1971 | Nemiroff | 74/473.25 |
| 4,519,266 A * | 5/1985 | Reinecke | 74/471 XY |
| 5,625,289 A * | 4/1997 | Daetz et al. | 324/207.14 |
| 6,057,682 A * | 5/2000 | McCurley et al. | 324/207.23 |
| 6,211,794 B1 * | 4/2001 | DeSoto | 340/686.1 |
| 6,295,887 B1 | 10/2001 | DeJonge et al. | |

(Continued)

FOREIGN PATENT DOCUMENTS

DE    195 28 457 A1    2/1997

(Continued)

*Primary Examiner* — Shelley Chen
(74) *Attorney, Agent, or Firm* — McGlew and Tuttle, P.C.

(57) ABSTRACT

A selection device for shifting a vehicle transmission, with a operating element (4), which can be rotated into different shift positions (6, 7, 8, 9) about an axis of rotation (5) and with a shaft (21), which is connected to the operating element (4) and is rotatable about the axis of rotation. An angle of rotation sensing device (32) is connected to the shaft, by which a rotation of the operating element (4) about the axis of rotation (5) can be sensed. An actuator (22) is provided by which a torque can be applied to the shaft (21) or a torque can be applied to oppose a rotation of the shaft (21). A control is connected to the angle of rotation sensing device (32) and to the actuator (22) for controlling the torque. The vehicle transmission (10) can be shifted into shift states (P, R, N, D) assigned to the shift positions (6, 7, 8, 9), wherein the shaft (21) extends along the axis of rotation (5) between the angle of rotation sensing means (32) and the operating element (4), which is designed as a rotary knob or button and is arranged at a first end (28) of shaft (21).

15 Claims, 11 Drawing Sheets

U.S. PATENT DOCUMENTS

| | | | |
|---|---|---|---|
| 6,480,752 B1 | 11/2002 | Blume et al. | |
| 6,515,472 B2 * | 2/2003 | Wurn et al. | 324/207.2 |
| 6,904,823 B2 * | 6/2005 | Levin et al. | 74/471 XY |
| 7,202,660 B2 * | 4/2007 | Kuroyanagi et al. | 324/207.25 |
| 7,358,719 B2 * | 4/2008 | Kondo | 324/207.25 |
| 7,427,859 B2 * | 9/2008 | Fukuoka et al. | 324/207.21 |
| 2002/0111763 A1 * | 8/2002 | Koga | 702/151 |
| 2002/0128753 A1 | 9/2002 | Numata et al. | |
| 2002/0175675 A1 * | 11/2002 | Wurn et al. | 324/207.2 |
| 2003/0010144 A1 * | 1/2003 | Petzold | 74/335 |
| 2003/0135314 A1 * | 7/2003 | Saito et al. | 701/51 |
| 2004/0118220 A1 * | 6/2004 | Takuma | 73/862.333 |
| 2005/0236219 A1 * | 10/2005 | Saito et al. | 180/433 |
| 2006/0055398 A1 * | 3/2006 | Kuroyanagi et al. | 324/207.21 |
| 2006/0181166 A1 * | 8/2006 | Saito et al. | 310/75 R |
| 2007/0035293 A1 * | 2/2007 | Fukuoka et al. | 324/207.21 |

FOREIGN PATENT DOCUMENTS

| | | |
|---|---|---|
| DE | 19712049 A1 | 9/1998 |
| DE | 197 30 297 | 1/1999 |
| DE | 197 47 269 A1 | 4/1999 |
| DE | 198 57 837 A1 | 6/2000 |
| DE | 200 14 425 U1 | 2/2001 |
| JP | 9128082 A | 5/1997 |
| JP | 2001206093 A | 7/2001 |
| JP | 2001518188 A | 10/2001 |
| JP | 2002189558 A | 7/2002 |
| JP | 2003162328 A | 6/2003 |

* cited by examiner

SELECTION DEVICE FOR SHIFTING A VEHICLE TRANSMISSION

CROSS REFERENCE TO RELATED APPLICATIONS

This application is a United States National Phase application of International Application PCT/DE2006/002259 and claims the benefit of priority under 35 U.S.C. §119 of German Patent Application DE 10 2005 061 285.7 filed Dec. 20, 2005, the entire contents of which are incorporated herein by reference.

FIELD OF THE INVENTION

The present invention pertains to a selection device for shifting a vehicle transmission, with an operating element, which can be rotated into different shift positions about an axis of rotation; with a shaft, which is connected to the operating element and is rotatable about the axis of rotation; with an angle of rotation sensing means, which is connected to the shaft and by means of which rotation of the operating element about the axis of rotation can be sensed; with an actuator, by means of which a torque can be applied to the shaft or a torque can be applied to oppose a rotation of the shaft; and with a control means, which is connected to the angle of rotation sensing means and to the actuator and by means of which the torque that can be sent or applied for opposition by the actuator can be controlled and the vehicle transmission can be shifted into shift states assigned to the shift positions. Furthermore, the present invention pertains to the use of such a selection device for shifting a vehicle transmission.

BACKGROUND OF THE INVENTION

A selection device for shifting a transmission of a motor vehicle, with a rotatably mounted shifting element, which can be rotated into different shift positions, is known from U.S. Pat. No. 6,295,887 B1. A potentiometer connected to the control cooperates with the operating element, so that an arrangement is created, by means of which the vehicle can be shifted in an electronically controlled manner. The device has, furthermore, a mechanical locking, which mediates a feeling of shifting to the user during shifting between the shift positions. In addition, a mechanical engaging contour is provided, which can block or release shifting over between certain shift positions.

A different number of shift positions may be desirable in different vehicle models, so that different lockings and engaging contours must be created as well. Different selection device must therefore also be made available for different vehicle models, so that the number of variants of this selection device is limited.

U.S. Pat. No. 6,904,823 B2 discloses a haptic selection device for a vehicle, with a selector lever mounted pivotably about two axes of rotation and with two actuators, which are coupled with the selector lever via belt drives and can apply forces to this. Furthermore, sensors, which are designed as optical decoders and by means of which the rotations of the shafts can be sensed, are coupled with the actuator shafts. A processor can read the signals sent by the sensors, determine the gear selected by the selector lever, and shift the vehicle into the gear via a control system. Furthermore, the processor can determine forces from the sensor signals and send these via actuators to the selector lever. In particular, it is possible to recreate a locking for the selector lever by means of the forces, and a force profile may be stored in a memory.

Based on the complicated mounting of the selector lever and of the two belt drives, the mechanics of this selection device is relatively expensive and is similarly bulky as a purely mechanical selection device, so that a selection device of a mechanically simpler and less bulky design still continues to be desirable.

A sensing mechanism for a control head mechanism is known from DE 200 14 425 U1, which belongs to a different class, wherein a control head is coupled with a drive shaft of an actuator, on the underside of which a coding disk is mounted, and wherein the control head position is scanned during a working motion of the coding disk by a measuring sensor. A microprocessor can read the sensor signals, calculate corresponding forces from these signals and send corresponding control signals to the actuator. The actuator transmits the forces to the control head.

This sensing mechanism belongs to a different class and is not intended or designed for shifting a vehicle transmission.

SUMMARY OF THE INVENTION

The object of the present invention is to perfect a selection device of the type described in the introduction such that the selection device can be used for a different number of shift states and can be at the same time built as a compact selection device at low cost.

The selection device according to the present invention for shifting a vehicle transmission has an operating element, which can be rotated into different shift positions about an axis of rotation; a shaft, which is connected to the operating element and is rotatable about the axis of rotation; an angle of rotation sensing means, which is connected to the shaft and by means of which rotation of the operating element about the axis of rotation can be sensed; an actuator, by means of which a torque can be sent to the shaft or a torque can be applied against rotation of the shaft; and a control means, which is connected to the angle of rotation sensing means and to the actuator and by means of which the torque that can be sent by the actuator or can be applied for opposition can be controlled and the vehicle transmission can be shifted into the shift states assigned to the shift positions, wherein the shaft extends between the angle of rotation sensing means and the operating element along the axis of rotation, which operating element is designed as a rotary knob or button and is arranged at a first end of the shaft.

It is possible by means of the actuator to offer haptic feedback to a human operator during the rotation of the operating element designed as a rotary knob or button, so that the selection device according to the present invention can be used without mechanical locking. The selection device according to the present invention can therefore be used for different numbers of shift positions. Furthermore, the selection device according to the present invention can be embodied as a compact selection device, because especially the operating element, shaft and angle of rotation sensing means are arranged along the axis of rotation, so that a transmission or belt drive for connecting the shaft to the angle of rotation sensing means can be eliminated. In the selection device according to the present invention, the angle of rotation sensing means is seated, because of its arrangement in space, especially on the shaft and is preferably fastened to same. The operating element, which is especially rigidly connected to the shaft, may be designed as a separate part or form the first end of the shaft. The operating element preferably joins the shaft on the front side. Furthermore, the operating element may be designed as a rotationally symmetrical body or as an essentially rotationally symmetrical body with a free front side facing away from the shaft, through which the axis of rotation extends. In addition, elevations and/or depressions, which make possible a better grip, may be arranged on the operating element around the axis of rotation.

The actuator may be arranged away from the axis of rotation and connected to the shaft via a transmission or a belt drive. However, the actuator is preferably seated on the shaft and is especially fastened thereto, so that the axis of rotation extends through the actuator and the aforementioned transmission can be eliminated. The space needed and the cost of the selection device according to the present invention decrease as a result of this as well. The actuator may have a stator and a rotor rotatable in relation thereto, which surrounds or forms the shaft and is rotatable about the axis of rotation. The actuator is arranged, in particular, between the angle of rotation sensing means and the operating element, and the shaft preferably passes through the actuator or the stator. The actuator may be designed as a drive, especially as an electrical drive, e.g., an electric motor. However, it is also possible to design the actuator as a brake, whose braking characteristics are especially electrically controllable.

The shaft may extend through the angle of rotation sensing means. However, the angle of rotation sensing means is preferably arranged at a second end of the shaft or forms same, so that the shaft is arranged especially completely between the angle of rotation sensing means and the operating element.

The angle of rotation sensing means may be designed as a relative value transducer. However, the angle of rotation sensing means is preferably designed as an absolute value transducer, so that the absolute angle of rotation of the operating element can be determined reliably and accurately.

The angle of rotation sensing means may be designed, for example, as a potentiometer or as an optical incremental transducer. However, the angle of rotation sensing means preferably has at least one magnetic field-sensitive sensor and at least one magnet, which is rotatable relative to this and is designed especially as a permanent magnet. The magnet may be fastened to the second end of the shaft, especially on the front side, whereas the magnetic field-sensitive sensor is arranged at a spaced location from the shaft. In particular, the magnetization of the magnet is directed at right angles to the axis of rotation and/or the magnetic field-sensitive sensor is arranged offset in relation to the magnet along the axis of rotation. The sensor is seated, in particular, on a printed circuit board at a spaced location from the magnet.

The magnetic field-sensitive sensor may be designed, for example, as a Hall effect sensor or as a magnetoresistive sensor. However, the magnetic field-sensitive sensor preferably has at least two Hall effect elements, which are arranged especially at spaced locations from one another and/or may be partially covered by a ferromagnetic disk, preferably on the side facing the magnet. The two Hall effect elements may be directed at right angles to one another, especially in respect to their sensitive surfaces. This design of the magnetic field-sensitive sensors makes it possible to sense the absolute value of the angle of rotation at high accuracy.

If the angle of rotation sensing means or sensor fails, no shift positions can be sensed any longer. The angle of rotation sensing means may therefore be designed as a redundant angle of rotation sensing means. In particular, at least one additional angle of rotation sensing means or at least one additional sensor is provided in order to compensate such a failure. If two sensors are provided, these may be arranged, e.g., on mutually opposite sides of the printed circuit board.

The actuator can be controlled by the control means especially such that the torque that can be sent by the actuator to the shaft or that can be applied to oppose a rotation of the shaft is variable as a function of the sensed rotation of the operating element. In particular, no torque is applied to the shaft or no torque is applied to oppose the rotation of the shaft in the shift positions, whereas the actuator sends a torque or a rotation of the shaft is opposed outside the shift positions. The control means can preferably actuate the actuator such that a locking is recreated during the rotation of the operating element. A mechanical locking shall be defined here, e.g., as a shaft contour, along which a springably prestressed sliding element can slide. The feeling arising during the sliding for a human operator who is feeling the sliding element can be preferably recreated by the selection device according to the present invention during the rotation of the operating element without the mechanical locking being physically present. Nevertheless, a mechanical locking may be additionally provided. It is also possible to actuate the actuator by means of the control means such that a push-button is recreated during the rotation of the operating element.

By varying the torque in a controlled manner, haptic feedback can be sent to a human operator rotating the operating element, for which a torque-vs.-angle of rotation characteristic may be stored, e.g., in the form of a force-vs.-angle of rotation table in a memory that can be read by the control means (the terms "force" and "torque" may be used especially synonymously here). The torque to be applied by the actuator to the shaft or to be applied to oppose rotation of the shaft can be determined from the characteristic/force-vs.-torque table as a function of the sensed rotation of the operating element and can be sent to the shaft or it can be applied to oppose rotation of the shaft. Especially zero positions of the characteristic are assigned to the shift positions, and the characteristic may have a periodic shape, especially in some areas, to simulate locking. At least one additional zero position, at which torque reversal takes place between two adjacent shift positions, may be located between the zero positions assigned to the shift positions. The characteristic preferably has here such a shape that the zero positions assigned to the shift positions form stable angle of rotation positions of the operating element, whereas the at least one zero position assigned to the torque reversal forms an unstable angle of rotation position. The characteristic advantageously has a hysteresis in the area of the torque reversal in order to avoid undesirably great torque jumps. Furthermore, a plurality of torque reversal hysteresis or zero positions may be provided in the characteristics, especially between two adjacent stable angle of rotation positions.

The actuator or electric drive is actuated especially with a pulse width-modulated signal from the control means. To achieve a special haptic effect, the control means may generate, in addition to the pulse width-modulated signal, a periodic signal, the pulse width-modulated signal may be modulated with the periodic signal, and the pulse width-modulated signal modulated with the periodic signal can be sent to the actuator. This effect leads to a vibration of the operating element, which is perceptible for the human operator, and can be used especially to identify a (logic) end position of the operating element.

With the actuator switched off, the operating element is especially freely rotatable. However, this free rotatability may also occur in case of a defective actuator, which may lead to operating errors, because no feeling of shifting is mediated to the human operator. Furthermore, rotation of the operating element or of the shaft and hence an unintended shifting of the transmission may occur because of vibrations in the vehicle. To prevent such an unintended shifting from occurring and to make it possible to mediate a feeling of shifting or a haptic feedback to the human operator during shifting between the shift positions despite a defective actuator, it is possible to provide an auxiliary locking, which can preferably be switched off and on, and can be operated especially independently from the actuator. If, for example, a defective state of the actuator is detected by the control means, the auxiliary locking can be switched on by the control means. The auxiliary locking may be designed as a mechanical locking and connected to the shaft, e.g., via a clutch. However, especially in addition to the actuator, a plurality of first elements may be preferably connected to the shaft and provided around an axis of rotation to form the auxiliary locking, a plurality of second elements may be provided around the axis of rotation, relative to which the first elements are rotatable about the axis of rotation, the first elements and second elements having a magnetic material, permanent magnets and/or electromagnets, and wherein the first elements can magnetically interact with the second elements while forming a magnetic locking. In particular, the first elements are arranged stationarily in relation to the operating element and/or stationarily on the shaft, and the second elements are preferably arranged around the shaft and/or around the second [sic-Tr.Ed.] elements. If the first elements are formed, for example, from a magnetic material or by permanent magnets and the second elements are formed, for example, by electromagnets, it is possible for magnetic forces, which create stable and unstable angle of rotation positions for the operating element, to act between the electromagnets or between the electromagnets and one or more of the first elements when one or more of the electromagnets are switched on. A locking is thus recreated for the human operator, and the stable angle of rotation positions preferably coincide with the shift positions of the operating element. The first elements are arranged especially around the axis of rotation of the shaft. Furthermore, the second elements are preferably also arranged around the axis of rotation of the shaft, but especially at spaced locations therefrom. In case of an intact actuator, the auxiliary locking, which may be arranged separately from the actuator in space or may also be integrated in same, may be switched off. In addition or as an alternative to an auxiliary locking, blocking of the operating element or of the shaft is possible as well.

Display elements, which can be actuated by the control means and are located especially on an arc extending around the axis of rotation, may be associated with the shift positions for displaying the current shift state.

The control means may have at least one interface, e.g., to a CAN bus of a vehicle, in order to send information to other means in the vehicle, which are likewise directly or indirectly connected to the interface, for example, to the bus. In particular, the control means is connected to a transmission control device of the transmission in order to switch the transmission control device into another mode of operation, to switch over between the shift states and/or to read a current shift state of the transmission. This connection may take place directly or via the interface or via the bus. Furthermore, it is possible to lock a parking brake of the vehicle in a certain shift position. This can also take place via the interface or via the bus.

A torque can be applied by the actuator to oppose a rotation of the shaft or a torque, which acts on the shaft by acting especially around the axis of rotation, can be sent by the actuator to the shaft. The torque vector is thus preferably located on the axis of rotation. Furthermore, the shaft may be rotated by the actuator, in case of suitable design (e.g., drive) thereof, about the axis of rotation. It is therefore possible to actuate the actuator by the control means such that the operating element is rotated into a certain position when the selection device is switched on. This position may, e.g., be predetermined, read from a memory or polled from the vehicle transmission or from the transmission control device thereof. Such an approach to the defined position is especially meaningful when the operating element is provided with a fixed marking, which displays the current shift state.

The selection device according to the present invention has especially a housing or a bracket, on which the operating element and/or the shaft is mounted rotatably. Furthermore, the stator of the actuator and/or a housing of the actuator may be fixed stationarily in relation to the bracket, especially fastened to the bracket. Rotation of the operating element or of the shaft will then take place relative to this bracket. According to one embodiment of the present invention, the rotation of the operating element and of the shaft about the axis of rotation represents the only degree of freedom concerning a motion of the operating element and of the shaft relative to the bracket. However, other degrees of freedom, e.g., an axial motion of the operating element and/or of the shaft along the axis of rotation and/or a pivoting or transverse motion of the operating element and/or of the shaft at right angles to the axis of rotation, are also possible as an alternative.

The present invention pertains, furthermore, to a vehicle, especially a motor vehicle, with a selection device according to the present invention and with a vehicle transmission, which is connected, especially electrically connected, to the selection device (optionally via the intermediary of a transmission control device), the transmission being able to be shifted by the selection device as a function of the sensed angle of rotation of the operating element into different shift states. The selection device may be varied according to all the above-mentioned embodiments.

The present invention pertains, in addition, to the use of a selection device according to the present invention for shifting a vehicle transmission, especially a motor vehicle transmission. The selection device may be varied according to all the above-mentioned embodiments.

The present invention will be described below on the basis of preferred embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 13 is a schematic view of a magnetic auxiliary lock which can be turned on;

DESCRIPTION OF THE PREFERRED EMBODIMENTS

Figure 1:
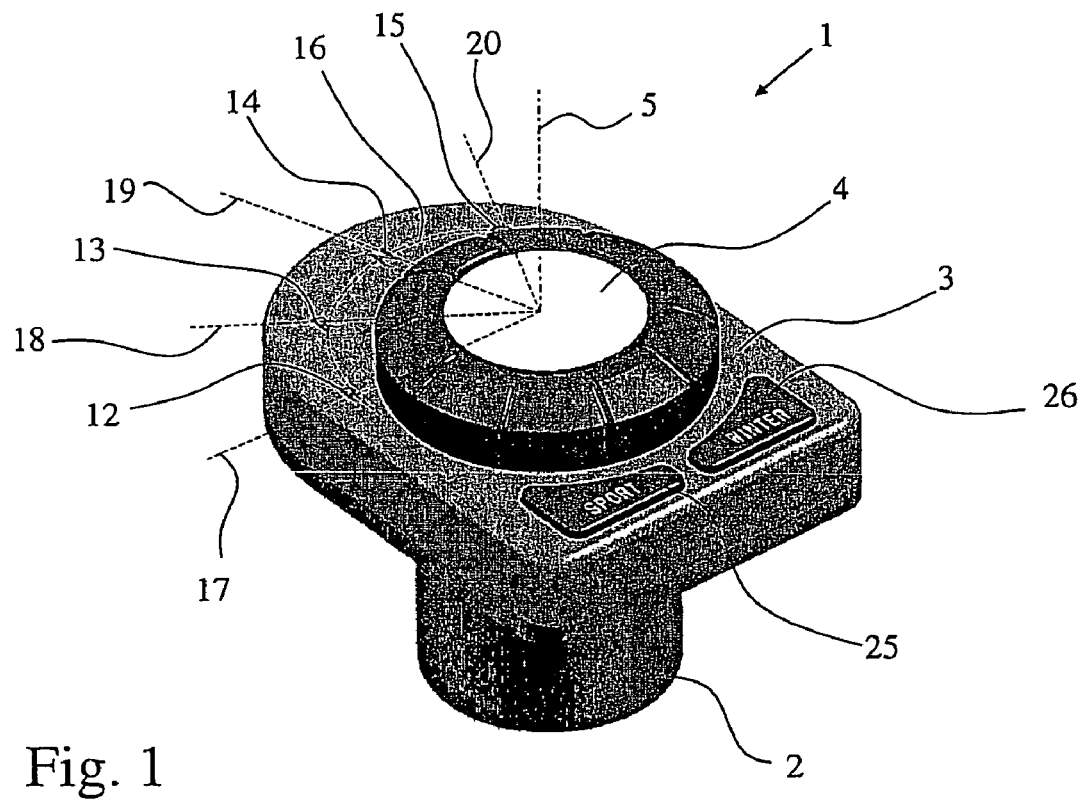
FIG. 1 is a perspective view of a first embodiment of the selection device according to the present invention.
Figure 2:
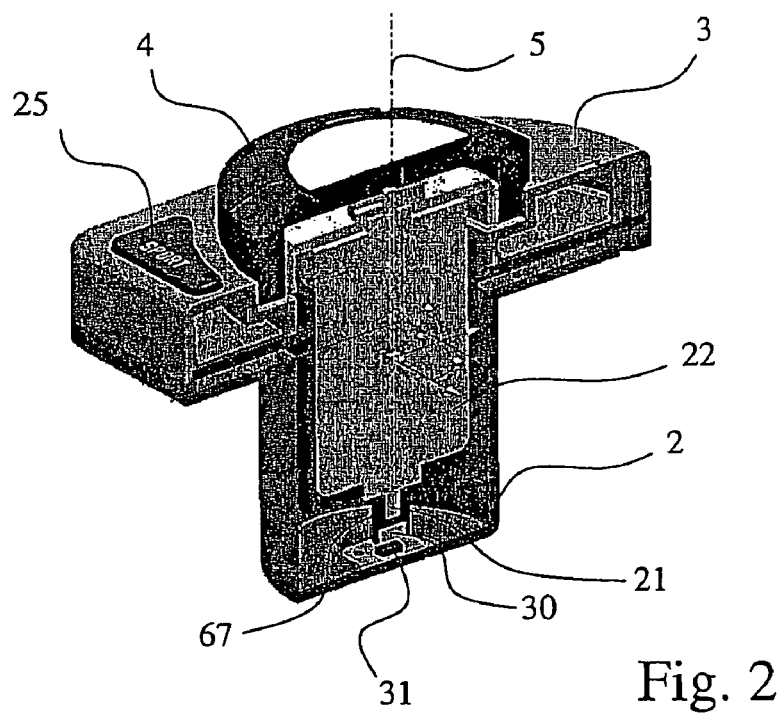
FIG. 2 is a sectional view of the first embodiment.
Figure 3:
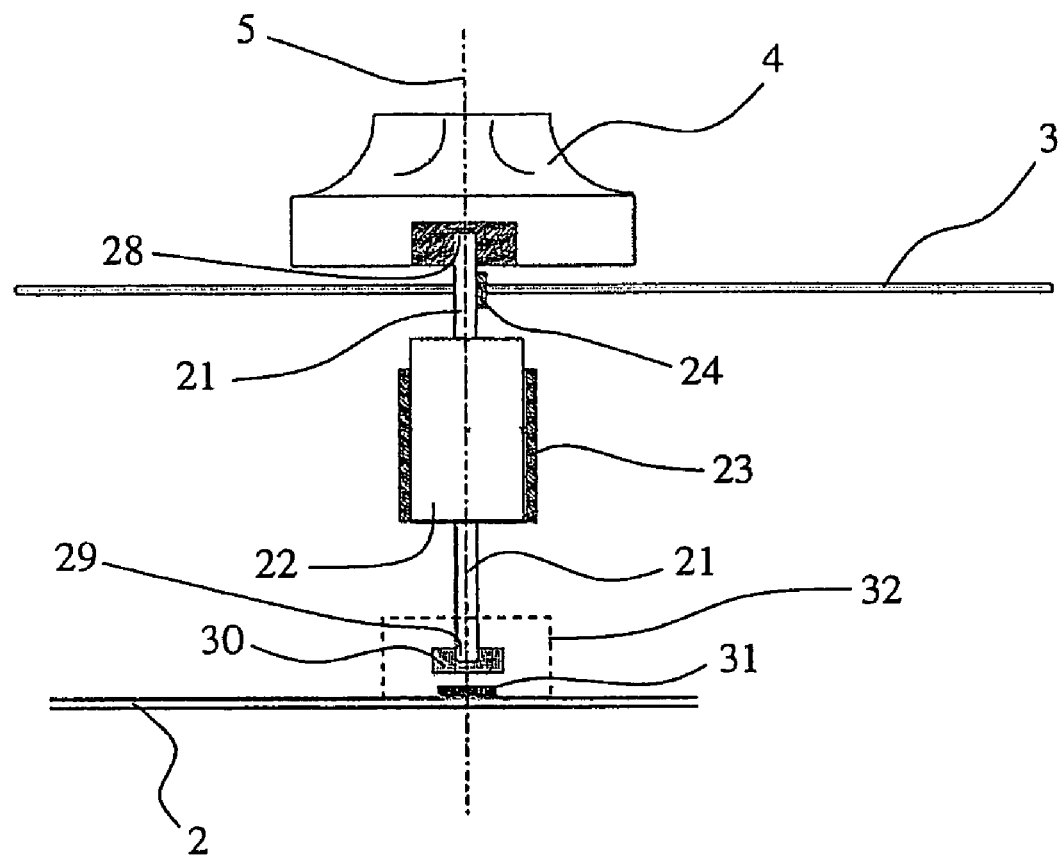
FIG. 3 is a schematic view of the first embodiment.

Referring to the drawings in particular, FIGS. 1 through 3 show different views of a first embodiment of the selection device 1 according to the present invention, which has a housing 2, a cover 3 attached to same and an operating element 4, which is designed as a button, protrudes from the cover 3 on the side facing away from the housing 2 and is rotatable relative to the housing 2 and to the cover 3 about an axis of rotation 5. The operating element 4 can be rotated about the axis of rotation 5 into a plurality of shift positions 6, 7, 8 and 9 (see FIG. 9), which are associated with the shift states P, R, N and D (see FIG. 9) of a transmission 10 (see FIG. 6) of a motor vehicle 11 (see FIG. 6). Furthermore, optical display elements 12, 13, 14 and 15, which are arranged on a circular arc 16 around the axis of rotation 5 or the operating element 4, are provided on the cover 3. The display elements 12, 13, 14 and 15 are associated with the shift states P, R, N and D of the transmission 10, the display element being associated with the current shift state optically highlighting this shift state compared to the other display elements, for example, by lighting. The display elements 12, 13, 14 and 15 are located on straight lines 17, 18, 19 and 20, which intersect the axis of rotation 5 and are directed at right angles to same. The straight lines 17, 18, 19 and 20 represent or mark angle of rotation positions of the operating element 4, which coincide with the shift positions 6, 7, 8 and 9.

The operating element 4 is connected to a shaft 21 in such a way that they rotate in unison, the shaft forming at the same time the drive shaft of a drive 22, which is designed as an electric motor here and is used as a drive for the shaft 21. Drive 22 can thus rotate the shaft 21 and apply a torque to the shaft 21. Furthermore, drive 22 has a stator 23, which is fastened to the housing, and the shaft 21, mounted rotatably by means of a bearing 24 on the cover 3 or on the housing 2, extends through the drive 22 or the stator 23.

In this embodiment, cover 3 is a rigidly connected separate part, which is connected to the housing 2 either permanently or detachably. As an alternative, it is possible to design the cover 3 as a one-piece cover with the housing 2. Furthermore, two push-buttons 25 and 26, by means of which the transmission 10 or a transmission control device 27 connected to the transmission 10 (see FIG. 6) can be shifted into different modes of operation, are provided on the cover 3.

The operating element 4 is fastened to a first end 28 of shaft 21, which first end protrudes from the housing 2 and passes through the cover 3, and is connected to same in such a way that they rotate in unison. At the second end 29 of shaft 21, which said end is located opposite the first end 28, a permanent magnet 30 is fastened by means of a magnet bracket 67, which is rotatably connected to the shaft 21 and forms an angle of rotation sensing means 32 together with a magnetic field-sensitive sensor 31. The magnetic field-sensitive sensor 31 is fastened to the housing 2 via the intermediary of a printed circuit board 70 (see FIG. 14) and is arranged offset in relation to magnet 30 along the axis of rotation 5.

Figure 4:
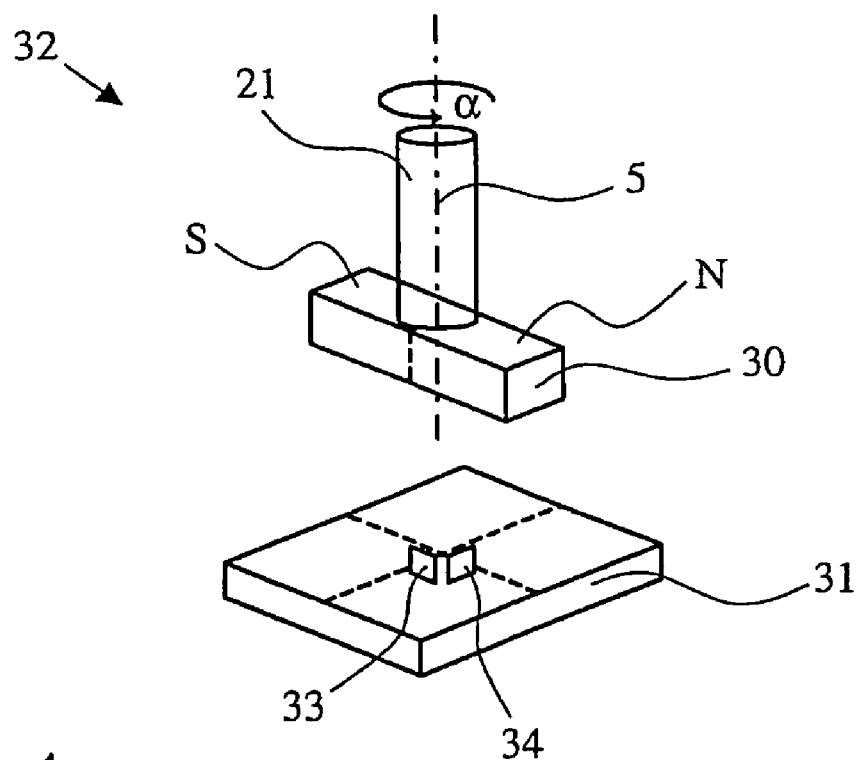
FIG. 4 is a schematic view of an angle of rotation sensing means according to the first embodiment.

FIG. 4 shows an enlarged, schematic view of the angle of rotation sensing means 32, wherein the magnetization of the magnet 30 is directed at right angles to the axis of rotation 5, which is indicated by the designations N for the magnetic north pole and S for the magnetic south pole of the permanent magnet 30. The magnetic field-sensitive sensor 31 has two Hall effect elements 33 and 34, which are arranged at spaced locations from one another, are directed especially at right angles to one another, and by means of which the rotation α of magnet 30 in relation to the magnetic field-sensitive sensor 31 can be sensed. Since magnet 30 is connected to the shaft 21 such that they rotate in unison and the latter is in turn connected to the operating element 4 in such a way that they rotate in unison, angle α also describes the rotation of the operating element 4 in relation to the housing 2 and the cover 3, so that the angle of rotation of operating element 4 in relation to the housing 2 can be sensed by the angle of rotation sensing means 32.

Figure 5:
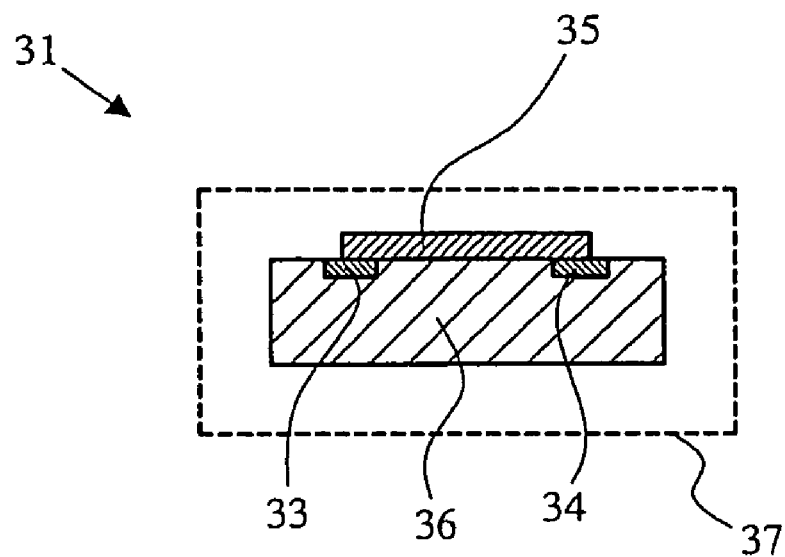
FIG. 5 is a schematic view of a magnetic field-sensitive sensor of the angle of rotation sensing means.

As is apparent from FIG. 5, the Hall effect elements 33, 34 are partially covered by a ferromagnetic disk 35, which bridges over the distance between the two Hall elements 33 and 34. Furthermore, the two Hall effect elements 33 and 34 are arranged on a common substrate 36 and are arranged, in particular, together with the ferromagnetic disk 35 and the substrate 36 in a common sensor housing 37, so that a compact sensor design is obtained.

Figure 6:
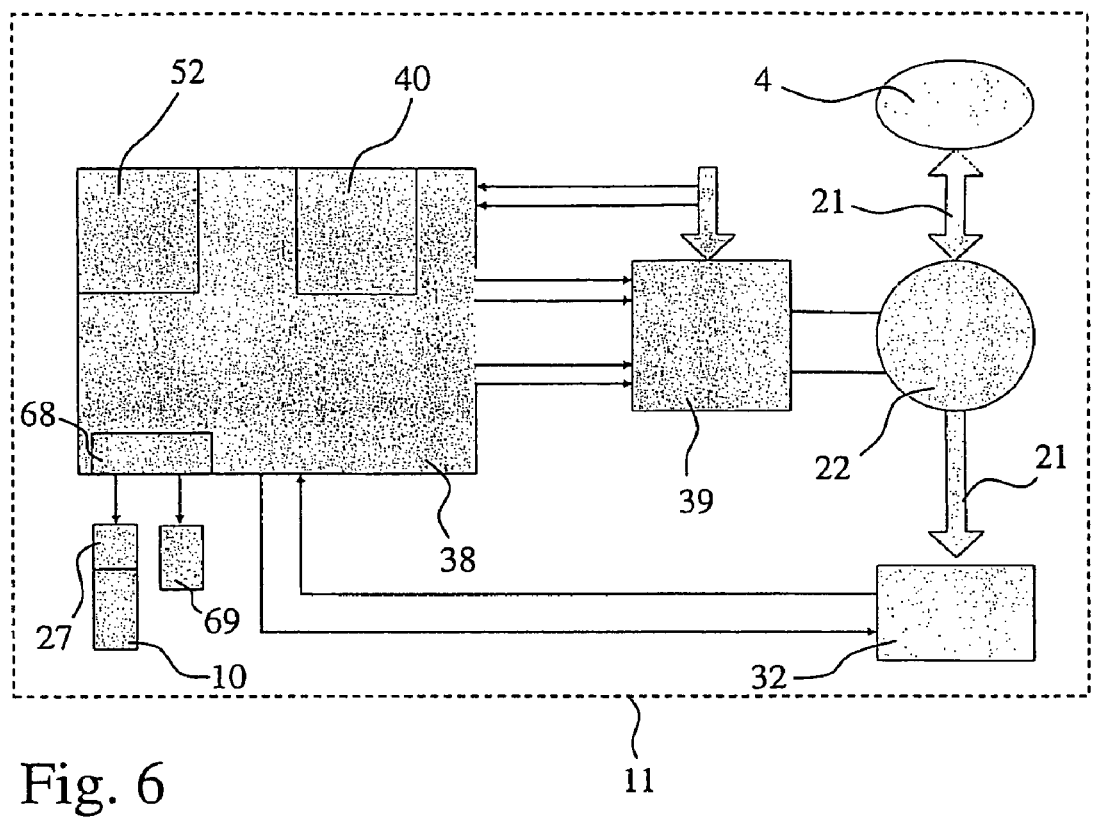
FIG. 6 is a block diagram of a control means according to the first embodiment.

FIG. 6 shows a schematic block diagram of selection device 1, wherein a control means 38 is electrically connected to the transmission control device 27 of transmission 10. Furthermore, the control means 38, which has especially a digital computer or microcontroller 52, is electrically connected to a motor interface 39, which is in turn connected electrically to the motor 22. Even though the motor interface 39 is shown as a separate component, it is preferably to be considered to belong to the control means 38. The electric motor 22 cooperates mechanically with the operating element 4 and with the angle of rotation sensing means 32, which is likewise connected electrically to the control means 38. Furthermore, the control means 38 has a memory 40 and is electrically connected, in particular, to a parking brake 69, which can be actuated by the control means 38 in shift state P of transmission 10. The electrical connection between the control means 38 and the parking brake 69 is established via an interface 68 and especially via the intermediary of a CAN bus, via which the control means 38 can also exchange data with other means or devices. The entire device shown in FIG. 6 is arranged in the motor vehicle 11 shown schematically.

Figure 7:
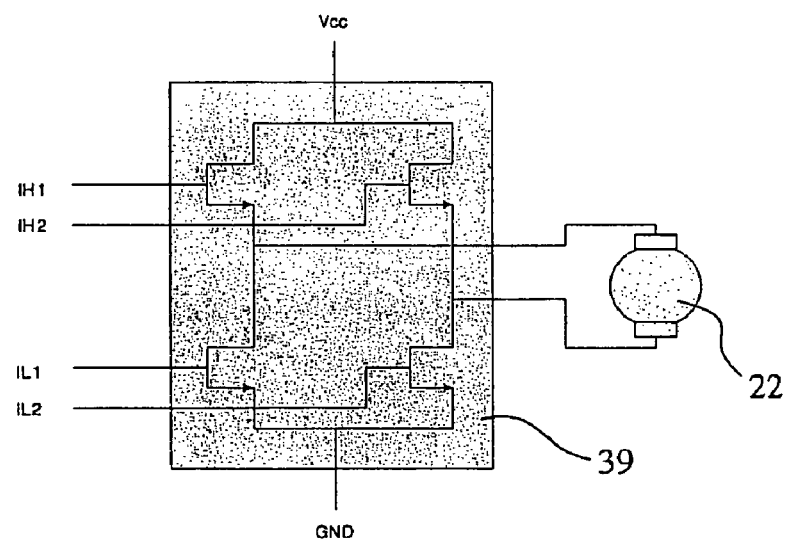
FIG. 7 is circuit diagram showing a motor interface of the control means.
Figure 8:
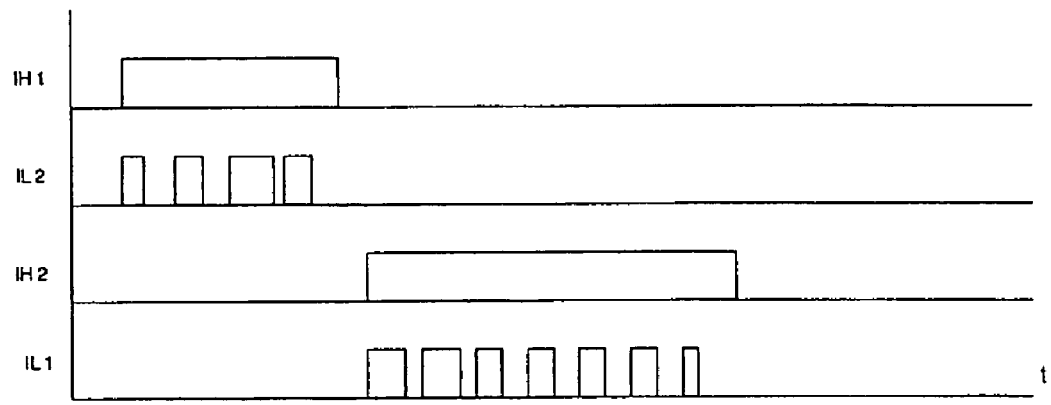
FIG. 8 is a diagram showing signal patterns of the motor interface.

FIG. 7 shows a more detailed view of the motor interface 39, which is connected to the motor 22 and which is actuated by the control device 38 via four signal lines IH1, IH2, IL1 and IL2. As is apparent from the corresponding signal patterns according to FIG. 8, the direction of rotation of the (motor) shaft 21 can be controlled via the signal lines IH1 and IH2, whereas a pulse width-modulated signal, by means of which especially the value of the torque that is or can be applied by the electric motor 22 to the shaft 21 is determined or controlled, is sent to the signal lines IL1 and IL2. The motor is preferably controlled via the setting of the pulse-width repetition rate of the pulse width-modulated signal.

Figure 9:
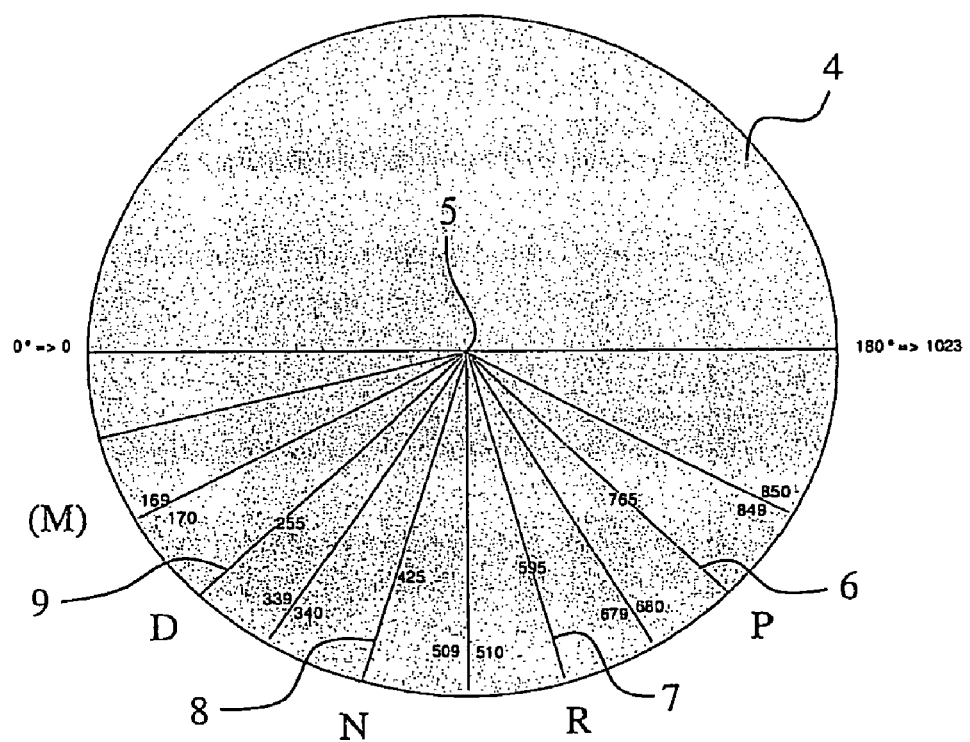
FIG. 9 is a view showing a plurality of angle of rotation positions and shift positions of the vehicle transmission, which are associated with these.

FIG. 9 schematically shows a plurality of angle of rotation positions of operating element 4 and the shift states P, R, N and D of the motor vehicle transmission 10, which states are assigned to these, and a continuous angle range of 180° is resolved discretely with 10 bits. A total of 1,024 sensible angle of rotation values are thus obtained, and a value of zero is assigned to an angle of rotation of 0° and a value of 1,023 is assigned to an angle of rotation of 180°. This quantization of the angle range is fine enough to resolve the angle of rotation α of the operating element 4 at a sufficient accuracy. The shift position 6 associated with shift state P is characterized by the value 765, the shift position 7 associated with shift state R is characterized by the value 595, the shift position 8 associated with the shift state N is characterized by the value 425, and the shift position 9 associated with shift state D is characterized by the value 255. Furthermore, a shift state M of transmission 10 is shown, which is in brackets, and which makes possible a manual upshifting and downshifting of the gears by means of push-buttons provided additionally, which may be arranged, for example, at a steering wheel. The shift state M is put in brackets, because it is provided only optionally.

Figure 10:
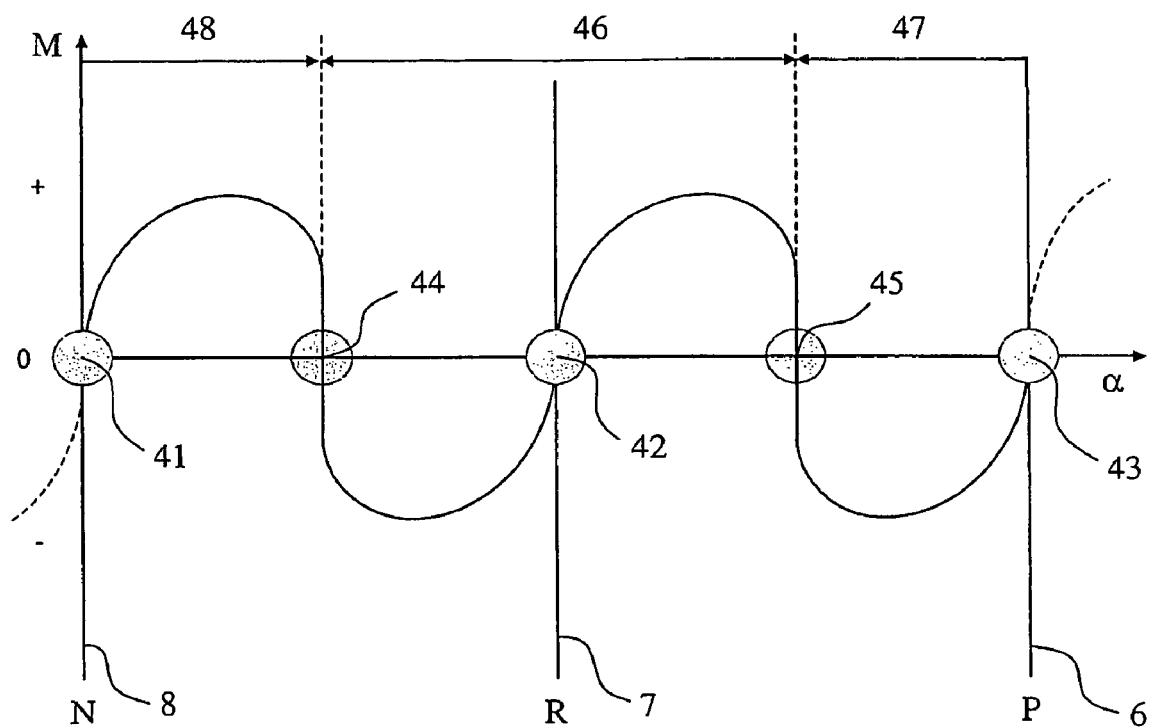
FIG. 10 is a diagram showing torque-vs.-angle of rotation characteristics.

FIG. 10 shows a partial torque-vs.-angle of rotation characteristic, which is stored in memory 40 especially as a table. The torque M to be applied by the electric motor 22 to the shaft is plotted as a function of the angle of rotation α of operating element 4 or of shaft 21. Only the shift states N, R and P have been taken into account in this partial view. The feeling of locking is recreated by the torque curve shown in FIG. 10 for the human operator, who is rotating the operating element 4. In particular, the characteristic has a zero position 41, 42, 43 each in the shift positions 6, 7 and 8, respectively, so that no torque is applied to the operating element 4 in shift positions 6, 7 and 8. In particular, the shift positions 6, 7 and 8 form stable angle of rotation positions of the operating element 4. Furthermore, the characteristic has a zero position 44, 45 between the shift positions 7 and 8 and between 6 and 7, preferably centrally between the respective shift positions. If, for example, the operating element is now rotated from shift position 8 into shift position 7, this rotary motion is counteracted up to zero position 44 by a torque, which can, however, be overcome by the human operator. The torque changes its sign nearly abruptly in the area of the zero position 44, so that the torque acts now in the direction of rotation towards the shift position 7. If the operating element 4 is rotated in the direction of shift position 6 starting from shift position 7, a torque, which counteracts this rotary motion, is applied on the operating element 4 between the zero positions 42 and 45. The torque changes its sign nearly abruptly in the area of zero position 45, so that the torque acts now in the direction of rotation towards shift position 6. Corresponding actions occur during the backward rotation of operating element 4 towards smaller angles α, so that the impression is created for the human operator that he is passing through a mechanical locking during the rotation of the operating element 4. The shift position range 46 between the torque reversal points 44 and 45 is assigned to shift position 7, the shift position range 47 between the torque reversal point 45 and the zero position 43 to shift position 6, and the shift position range 48 between the torque reversal point 44 and the zero position 41 to shift position 8. It shall be borne in mind in this connection that FIG. 10 shows only part of the characteristic, so that another torque reversal point and another zero position, which corresponds to shift position 9 for the shift state D, may still be provided in the direction of lower values for α to the left of shift position 8. Range 48 may extend in this case up to this torque reversal point, which is not shown.

Figure 11:
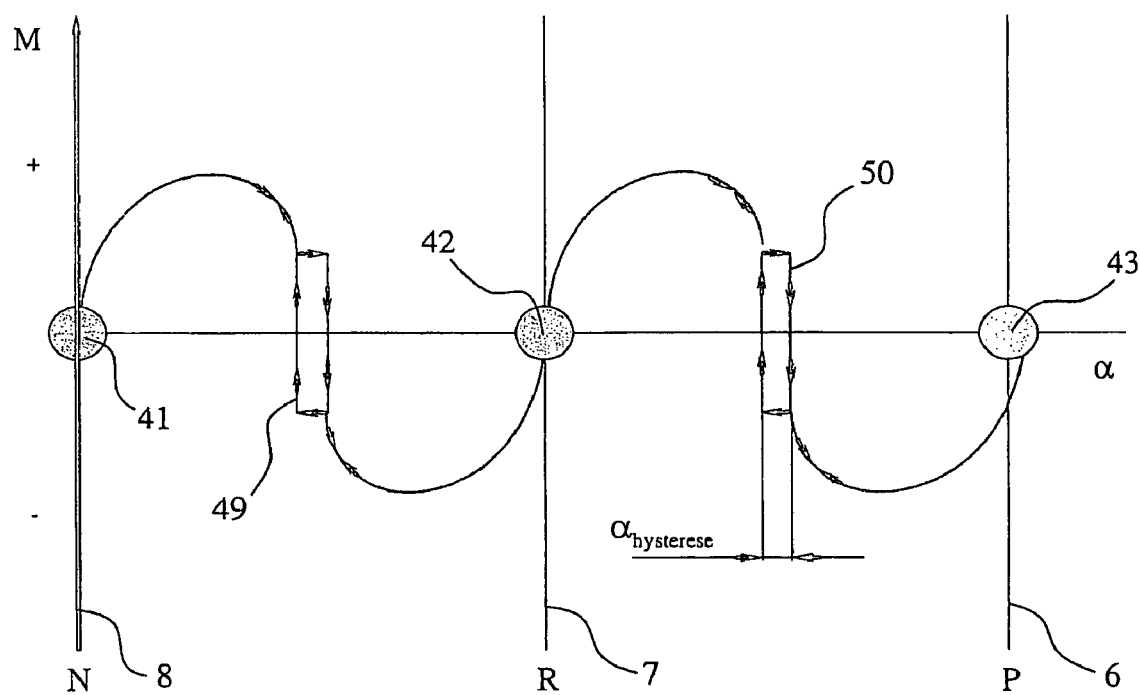
FIG. 11 is a diagram showing the characteristics according to FIG. 10 with hysteresis shown.

FIG. 11 shows that the torque reversal preferably takes place due to a hysteresis 49, 50 at the time of the changeover from one shift position range to the next, i.e., the state of the motor may depend on the past with equal sensor signals. The hysteresis is embodied at the limit between two adjacent shift position ranges in order to avoid torque jumps, which may develop because of a quantization noise of an AD converter, which converts, for example, the current angular position of operating element 4 into discrete 10-bit values. The range for the hysteresis may be marked in the force or torque field by an "invalid" number, which is not used for calculating the pulse width of the actuating signal for the motor 22. The shift position ranges 46, 47 and 48 can be determined unambiguously at sufficient accuracy by this process regardless of possible disturbances of the measured signal. This also applies to the shift position range, not shown, which is assigned to the shift position 9. As is illustrated in FIG. 11, the last value of the torque is maintained in the range $α_{hysteresis}$ at the time of the changeover between the shift position ranges. If the torque changes its sign when the current shift position range is left, the operating element must again travel by the path $α_{hysteresis}$ before the signal will (again) reverse. The torque can consequently appear with different signs in the range of the hysteresis, depending on the previous direction of rotation.

Figure 12:
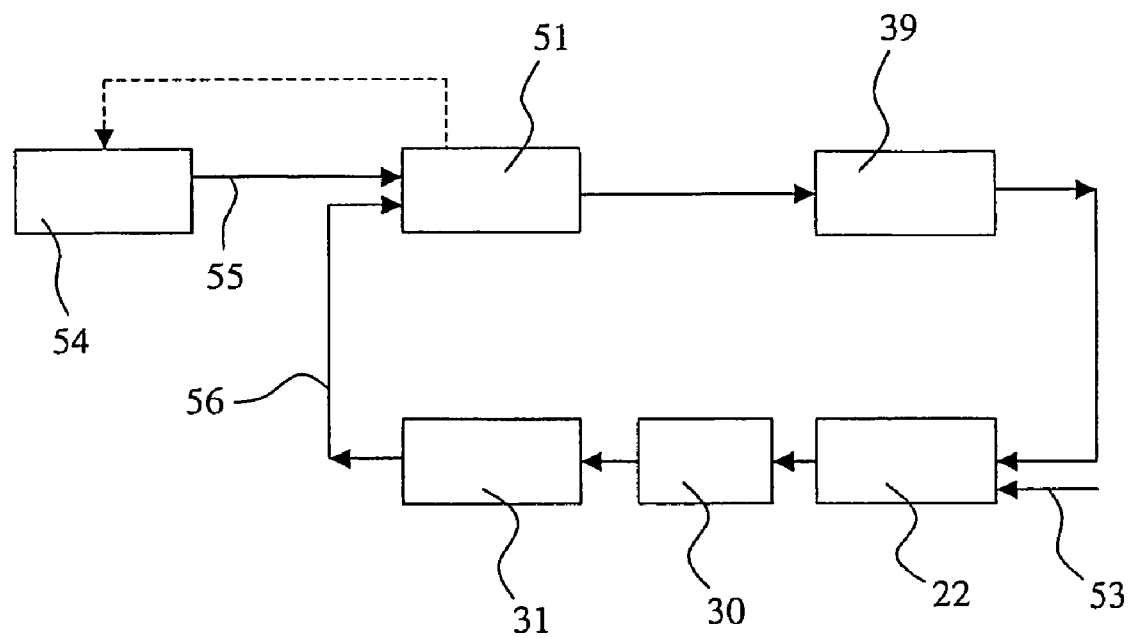
FIG. 12 is a control technical equivalent circuit diagram of the selection device according to the present invention.

FIG. 12 shows a control technical equivalent circuit diagram of the selection device 1, wherein a regulator 51 formed by the control means 38 acts on the motor interface 39, which actuates the drive or the electric motor 22, which cooperates with magnet 30, which can rotate relative to sensor 31, whose output signal is sent to the regulator 51. Furthermore, the shaft 21 of drive 22 can be rotated by the human operator via the operating element 4, which is shown as a disturbance variable 53 sent to the drive 22 in the equivalent circuit diagram. Furthermore, an actual value shift position 54 is sent to the regulator 51 as a desired quantity 55, which can be determined, for example, by determining the current shift position range via the sensed angle of rotation α and assigning it to the corresponding shift position. The desired quantity is preset, e.g., by rotating the operating element 4 or shaft 21. Since the angle of rotation c is sent as a measured or actual value to the regulator 51, the desired quantity can also be determined by the regulator 51 itself or the presetting of this desired quantity can be initiated by the regulator 51 itself, which is indicated by an arrow drawn in broken line. If, for example, the shift position range 46 is sensed, the desired value 55 is determined by the shift position 7 or by the shift state R. If, by contrast, the shift position range 47 is sensed, the desired value 55 is characterized by shift position 6 or by shift state P. If the shift position range 48 is sensed, the desired value 55 is characterized by shift position 8 or by shift state N. This also applies analogously to the shift state D.

If the operating element 4 is being rotated by the human operator starting from shift position 6 or from shift state P in the direction of increasing angle values α, the drive 22 can oppose this rotary motion with a constant torque, because the shift position 6 is not followed by any further shift state according to this embodiment in the direction of increasing angle of rotation values α. It is thus signaled to the human operator that no valid shift position can be reached any longer by rotating the operating element any further. In particular, a periodic signal, which brings about, in addition to the acting torque, a vibration of the operating element, which vibration can be felt by the human operator, can be superimposed to the pulse width-modulated signal for actuating drive 22. This effect makes it even more clear to the human operator that no valid shift position can be reached any longer by rotating the operating element 4 further in the direction of increasing angle of rotation values α. If the optional shift position M according to FIG. 9 is provided, it is, furthermore, possible that starting from the shift position 9, rotation of the operating element in the direction of decreasing angles of rotation α is opposed by an especially increasing torque, which does not, however, exceed a maximum. The optional shift state M forms an unstable state without torque reversal, which mediates the feeling to the human operator as if a mechanical rotary knob were being actuated. The torque curves shown in FIGS. 10 and 11 are only exemplary and can be adapted to the wishes of the human operator.

Figure 13:
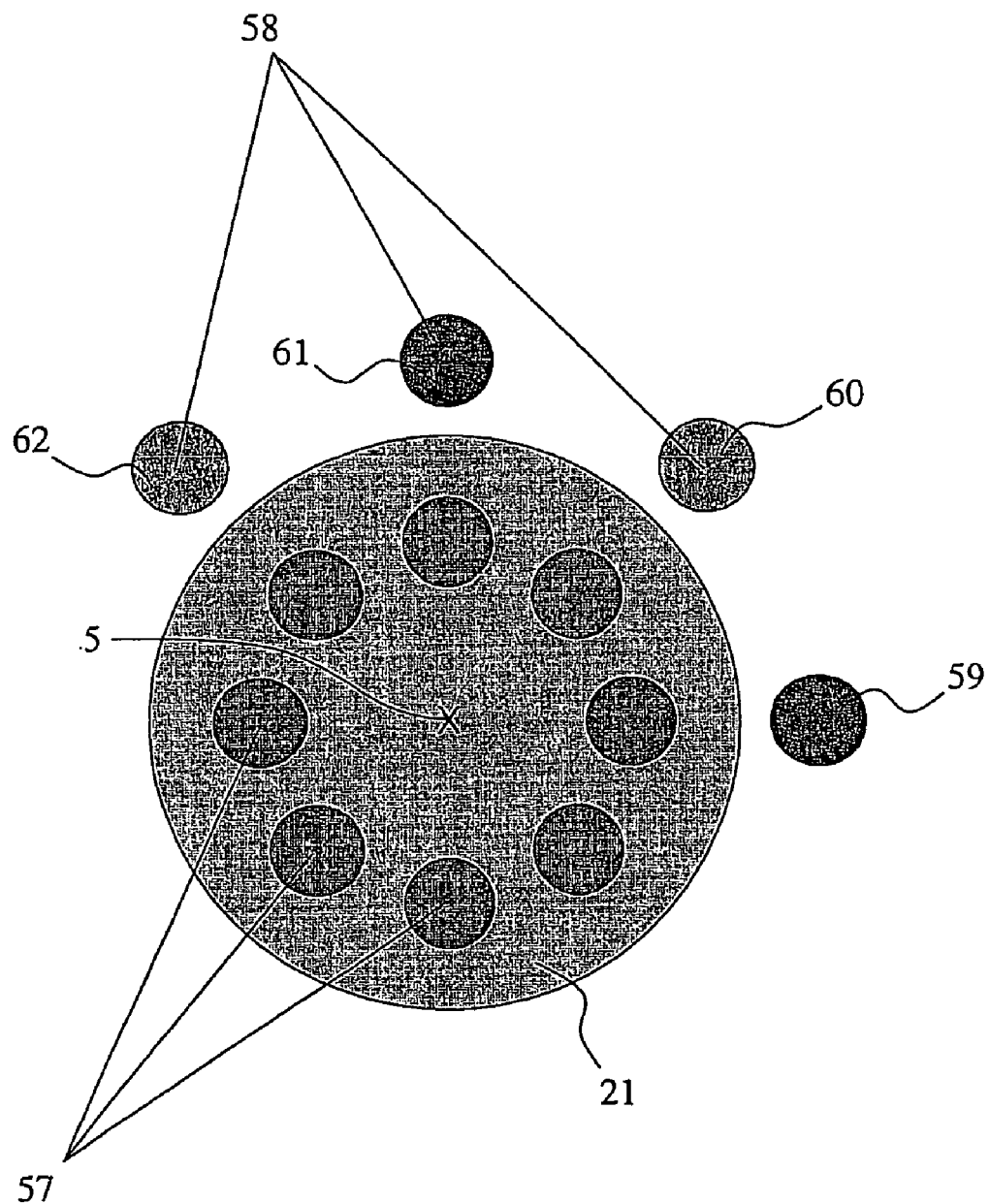

FIG. 13 shows a schematic sectional view of a magnetic auxiliary locking, which can be switched on, wherein a plurality of first elements 57 formed from a magnetic material or permanent magnets are arranged on or in the shaft 21 around the axis of rotation 5. Furthermore, a plurality of second elements 58 designed as electromagnets, relative to which the first elements 57 are rotatable with the shaft 21 about the axis of rotation 5, are provided around shaft 21. Electric current can flow through the electromagnets 58 individually, in groups or through all or together and they can thus be switched on, as a result of which magnetic forces will act between the first elements 57 and the second elements 58. Since the first elements are arranged at spaced locations from one another and preferably uniformly distributed around the axis of rotation 5, these forces change especially periodically when the operating element 4 is being rotated in one direction, so that the impression of locking is created for the human operator. The second elements 58 are also located at spaced locations from one another, and fewer second elements 58 may be provided than first elements 57. According to FIG. 13, the electromagnets 59 and 61 are switched on, whereas the electromagnets 60 and 62 are switched off. Furthermore, it is possible to switch on the electromagnets 60 and 62 and to switch off the electromagnets 59 and 61. If the auxiliary locking is not needed, all electromagnets 59, 60, 61 and 62 may be switched off.

The auxiliary locking is switched on by the control means 38 when this has determined a defect in drive 22, because free rotatability of the operating element 4 could otherwise develop. A feeling recreating locking can thus be mediated to the human operator while rotating the operating element 4 even when drive 22 has failed. The possibilities of setting the torque curve of this auxiliary locking are, however, limited. As an alternative, it is possible to switch on the auxiliary locking permanently.

Figure 14:
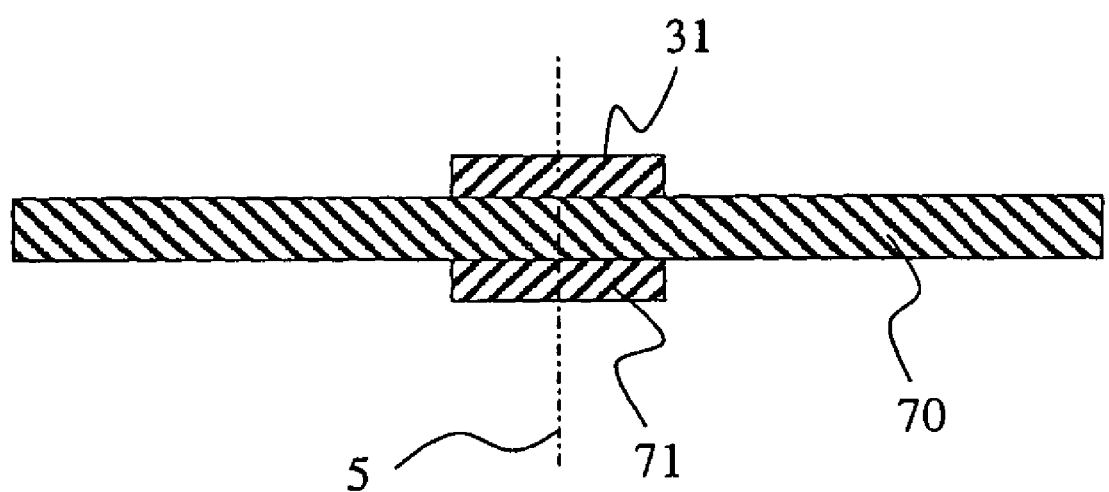
FIG. 14 is a schematic view of a redundant sensor array.

FIG. 14 schematically shows the magnetic field-sensitive sensor 31, which is seated on the printed circuit board 70 arranged in the housing 2. A second magnetic field-sensitive sensor 71, which is used to redundantly sense the angle of rotation α, is arranged on the side of the printed circuit board 70 facing away from sensor 31 or magnet 30. Both sensors are located on the axis of rotation 5 or on an extension thereof and are especially of identical design.

Figure 15:
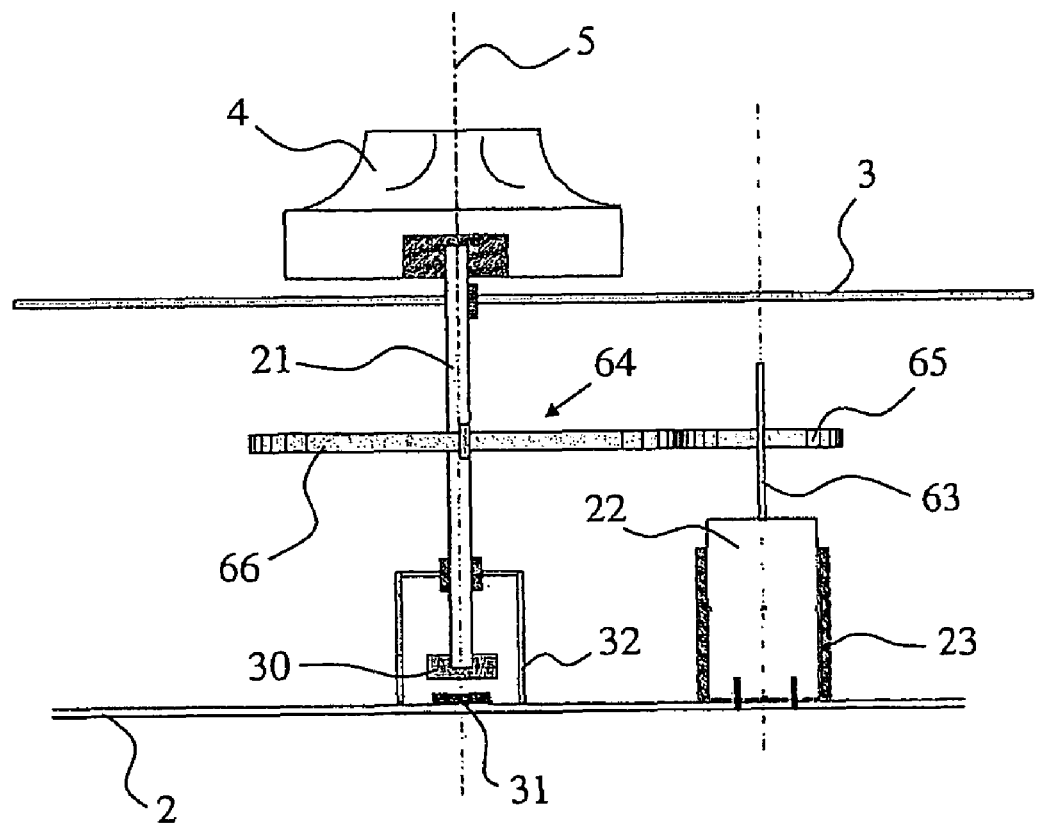
FIG. 15 is a schematic view of a second embodiment of the selection device according to the present invention.

FIG. 15 shows a second embodiment of the selection device according to the present invention, wherein features that are the same as or similar to those in the first embodiment are designated by the same reference numbers as in the first embodiment. The second embodiment differs from the first embodiment only in that the drive 22 is not seated on shaft 21, but is fastened to the housing 2 at a spaced location from the shaft. The drive shaft or the rotor 63 of drive 22 is connected to shaft 21 via a transmission 64, which has a first spur gear 65 connected to the drive shaft 63 in such a way that they rotate in unison, and a second spur gear 66, which is connected to shaft 21 in such a way that they rotate in unison and which meshes with the first spur gear 65.

While specific embodiments of the invention have been shown and described in detail to illustrate the application of the principles of the invention, it will be understood that the invention may be embodied otherwise without departing from such principles.

The invention claimed is:

1. A selection device for shifting a vehicle transmission, the selection device comprising:
an operating element designed as a rotary knob or button, which can be rotated into different shift positions about an axis of rotation;
a shaft, which is connected to said operating element and is rotatable about an axis of rotation;
an angle of rotation sensing means, which is operatively connected to said shaft and by means of which a rotation of said operating element can be sensed;
an actuator, by means of which a torque can be applied to said shaft or a rotation of said shaft can be opposed with said torque; and
a control means, which is connected to said angle of rotation sensing means and to said actuator and by means of which the torque that can be applied or applied for opposition by said actuator can be controlled, and said vehicle transmission can be shifted into shift states assigned to shift positions, said shaft extending along said axis of rotation between said angle of rotation sensing means and said operating element, which is arranged at a first end of said shaft, said actuator and said angle of rotation sensing means being seated on said shaft, said angle of rotation sensing means being arranged at a second end of said shaft, said angle of rotation sensing means comprising at least one magnetic field-sensitive sensor and at least one magnet rotatable in relation to said magnetic field-sensitive sensor, wherein said magnet is fastened at a second end of said shaft, the magnetization of said magnet is directed at right angles to said axis of rotation, and said magnetic field sensitive sensor is arranged offset in relation to said magnet along said axis of rotation.

2. A selection device in accordance with claim 1, wherein an absolute angle of rotation of said operating element about said axis of rotation can be sensed by said angle of rotation sensing means.

3. A selection device in accordance with claim 1, wherein said magnetic field-sensitive sensor has at least two said Hall effect elements, which are partially covered by a ferromagnetic disk.

4. A selection device in accordance with claim 1, wherein said actuator can be controlled by said control means such that the torque that can be applied by means of said actuator to said shaft or used to oppose a rotation of said shaft can be varied as a function of the sensed rotation of said operating element.

5. A selection device in accordance with claim 1, wherein said actuator can be controlled by said control means such that no torque is applied to said shaft or applied to oppose a rotation of said shaft in said shift positions, whereas a torque is applied to said shaft or is applied to oppose a rotation of said shaft outside said shift positions.

6. A selection device in accordance with claim 4, wherein said control means has a memory, in which a torque-vs.-angle of rotation characteristic is stored, according to which the torque that can be applied by said actuator on said shaft or can be applied to oppose a rotation of said shaft can be determined as a function of the sensed rotation, the shape of the characteristic having hystereses.

7. A selection device in accordance with claim 1, wherein:
a pulse width-modulated signal and a periodic signal can be generated by said control means;

the pulse width-modulated signal can be modulated with the periodic signal; and the pulse width-modulated signal modulated with the periodic signal can be sent to said actuator.

8. A selection device in accordance with claim 1, wherein in addition to said actuator;

a plurality of first elements are connected to said shaft and arranged around a axis of rotation;

a plurality of second elements, relative to which said first elements are rotatable about said axis of rotation, are provided around said axis of rotation;

said first and said second elements have a magnetic material, permanent magnets and/or electromagnets; and said first elements can magnetically interact with said second elements while forming a magnetic locking.

9. A selection device in accordance with claim 1, further comprising display elements, which can be actuated by said control means and are arranged in an arc extending about said axis of rotation, assigned to said shift positions.

10. A selection device in accordance with claim 1, wherein said angle of rotation sensing means has a redundant design.

11. A process of shifting a vehicle transmission comprising the steps of:

providing a selection device with an operating element designed as a rotary knob or button, with a shaft connected to said operating element and rotatable about an axis of rotation, with an angle of rotation sensing means operatively connected to said shaft, with an actuator for applying a torque to said shaft or opposing a rotation of said shaft with the torque, the shaft extending along the axis of rotation between the angle of rotation sensing means and the operating element arranged at a first end of the shaft, and with a control means, which is connected to said angle of rotation sensing means and to said actuator and by means of which the torque that can be applied or applied for opposition by said actuator can be controlled, said actuator and said angle of rotation sensing means being seated on said shaft, said angle of rotation sensing means being arranged at a second end of said shaft, said angle of rotation sensing means comprising at least one magnetic field-sensitive sensor and at least one magnet rotatable in relation to said magnetic field-sensitive sensor, wherein said magnet is fastened at a second end of said shaft, the magnetization of said magnet is directed at right angles to said axis of rotation, and said magnetic field-sensitive sensor is arranged offset in relation to said magnet along said axis of rotation;

rotating the selection device into different shift positions about an axis of rotation;

sensing a rotation of said operating element with angle of rotation sensing means; and shifting the vehicle transmission into shift states assigned to the shift positions.

12. A process of shifting a vehicle transmission in accordance with claim 11, wherein said control means actuates said actuator such that a locking is recreated during the rotation of said operating element.

13. A process of shifting a vehicle transmission in accordance with claim 11, wherein said control means actuates said actuator such that a push-button is recreated during the rotation of said operating element.

14. A process of shifting a vehicle transmission in accordance with claim 11, wherein said control means locks a parking brake of said vehicle in a certain shift position.

15. A process of shifting a vehicle transmission in accordance with claim 11, wherein said control means actuates said actuator such that when the selection device is turned on, said operating element is rotated into a predetermined shift position, into a shift position read from a memory or into a shift position polled by said vehicle transmission.

* * * * *